UNITED STATES PATENT OFFICE.

M. B. DODGE, OF NEW YORK, N. Y.

IMPROVEMENT IN DESULPHURIZING ORES.

Specification forming part of Letters Patent No. 47,094, dated April 4, 1865.

*To all whom it may concern:*

Be it known that I, M. B. DODGE, of the city, county, and State of New York, have invented a new and useful Improvement in Desulphurizing Ores; and I do hereby declare that the following is a full, clear, and exact description of the same.

This invention consists in treating auriferous or argentiferous ore, after it has been stamped, with steam and common salt in such a manner that the salt is equally diffused throughout the entire mass without unnecessary saturation with water, and when the mixture is put into the desulphurizing-furnace the full benefit of the salt is obtained and the sulphur is effectually separated.

The use of common salt in desulphurizing ores has been practiced for some time; but generally the salt is either simply mixed with the ore, and in this state the mixture is put into the desulphurizing-furnace, or the salt is dissolved in water and the ore saturated with the solution. In order to allow the salt to act to the best advantage, it is necessary to bring the same in the most intimate contact with all the particles of ore previous to exposing the mixture to the desulphurizing process; but I have found that the saturation of the pulverized ore with water renders it difficult to handle by automatic mechanical contrivances, and unfit for immediate introduction to the desulphurizing-furnace. This object I effect by the use of a steam-tight tank with a perforated false bottom. Into this tank I place the pulverized ore mixed with the requisite quantity of salt in a dry state, and then I run a steam-pipe under the false bottom and admit steam. By the action of the steam the ore is heated, and a slight condensation of the steam dissolves the salt, so that it diffuses equally throughout the entire mass of ore, bringing the same in intimate contact with every particle of ore. The surplus water of condensation is received under the false bottom of the tank, so that any unnecessary dampening of the ore is avoided.

When the ore, after having been treated with salt and steam in the manner as above described, is placed in the desulphurizing-furnace, the full benefit of the salt is obtained, the chlorine of the same takes the place of the sulphur in the ore, and the sulphur, being converted in sulphurous acid by the action of the oxygen of the atmosphere and by the heat in the furnace, combines with the sodium, which also oxidizes.

I am well aware that salt has been and is now used in treating auriferous and argentiferous ores previous to the desulphurizing process, and I do not therefore claim as my invention the use of salt in the desulphurizing of ores.

I claim as an improved process of treating ores for desulphurizing the same—

Mixing the ore and salt in a dry state and afterward steaming them within a close vessel with a perforated bottom.

M. B. DODGE.

Witnesses:
 WM. F. MCNAMARA,
 M. M. LIVINGSTON.